(12) United States Patent
Seidler

(10) Patent No.: US 11,267,230 B2
(45) Date of Patent: Mar. 8, 2022

(54) LAMINATED GLASS, LAMINATED SAFETY GLASS, AND METHOD FOR THE PRODUCTION THEREOF

(71) Applicant: SEEN GMBH, Waldstatt (CH)

(72) Inventor: Rouven Seidler, Thörigen (CH)

(73) Assignee: SEEN GMBH, Waldstatt (CH)

( * ) Notice: Subject to any disclaimer, the term of this patent is extended or adjusted under 35 U.S.C. 154(b) by 69 days.

(21) Appl. No.: 16/797,351

(22) Filed: Feb. 21, 2020

(65) Prior Publication Data
US 2020/0262185 A1    Aug. 20, 2020

Related U.S. Application Data

(63) Continuation-in-part of application No. PCT/EP2018/072567, filed on Aug. 21, 2018.

(30) Foreign Application Priority Data

Aug. 21, 2017 (DE) ..................... 10 2017 119 055.4

(51) Int. Cl.
    B32B 15/04      (2006.01)
    B32B 17/10      (2006.01)
    (Continued)

(52) U.S. Cl.
    CPC ........ *B32B 17/10036* (2013.01); *B32B 3/085* (2013.01); *B32B 7/12* (2013.01);
    (Continued)

(58) Field of Classification Search
    CPC .............. B32B 17/10036; B32B 3/085; B32B 17/10247; B32B 17/10431
    (Continued)

(56) References Cited

U.S. PATENT DOCUMENTS 2,996,419 A    8/1961 Schmick
3,745,309 A *  7/1973 Gruss ................ B32B 17/10761
                                                   219/522
(Continued)

FOREIGN PATENT DOCUMENTS

DE          230759 A     2/1910
DE         2313278 A1    9/1973
(Continued)

OTHER PUBLICATIONS

International search report for patent application No. PCT/EP2018/072567 dated Dec. 11, 2018.

*Primary Examiner* — Lauren R Colgan
(74) *Attorney, Agent, or Firm* — Bachman and Lapointe PC; George Coury

(57) ABSTRACT

A one-way laminated glass (1000, 2000, 3000, 4000, 5000, 6000A, 6000B, 6000C, 6000D) for installation in facades (6000, 7000) or for interior design, comprising a first and a second glass pane (100, 101, 102, 200, 201, 202), and also comprising, arranged between the first and second glass pane and bonded to these, a lamination foil composite (1001, 3001, 3002) with a first lamination foil (110, 111, 112, 113) and with a second lamination foil (210, 211, 212, 213), where
    a large number of paillettes (300, 301, 302, 303, 304, 305, 500, 600A, 600B, 600C, 600D, 700) with a first light-absorbing surface (501) is arranged between the first lamination foil and second lamination foil, and a visual effect (E) is concomitantly achieved, where
    the light-absorbing surface (501) of the paillettes faces toward the first lamination foil, and the paillettes are arranged at distances from one another such that when the laminated glass is viewed from the side corresponding to the light-absorbing surface (501) of the paillettes it appears transparent, (Continued)

where a second surface (502) of the paillettes, which faces toward the second lamination foil, is optically reflective, and when the laminated glass is viewed from the side corresponding to the optically reflective surface (502) of the paillettes it appears less transparent.

24 Claims, 9 Drawing Sheets

(51) Int. Cl.
*B32B 3/08* (2006.01)
*B32B 7/12* (2006.01)
*B32B 27/08* (2006.01)

(52) U.S. Cl.
CPC .... *B32B 17/10045* (2013.01); *B32B 17/1055* (2013.01); *B32B 17/1088* (2013.01); *B32B 17/10247* (2013.01); *B32B 17/10357* (2013.01); *B32B 17/10431* (2013.01); *B32B 17/10651* (2013.01); *B32B 17/10935* (2013.01); *B32B 27/08* (2013.01); *B32B 17/1022* (2013.01); *B32B 17/10192* (2013.01); *B32B 17/10761* (2013.01); *B32B 2250/40* (2013.01); *B32B 2307/402* (2013.01); *B32B 2307/412* (2013.01); *B32B 2307/416* (2013.01)

(58) Field of Classification Search
USPC .................................................. 428/428, 432
See application file for complete search history.

(56) References Cited

U.S. PATENT DOCUMENTS

| | | | |
|---|---|---|---|
| 5,262,894 | A | 11/1993 | Wheatley et al. |
| 6,258,429 | B1 | 7/2001 | Nelson |
| 6,355,125 | B1* | 3/2002 | Tahon ............... B32B 17/10036 |
| | | | 156/265 |
| 2009/0169795 | A1 | 7/2009 | Fiechter |
| 2015/0251384 | A1* | 9/2015 | Bennison ............ B32B 37/1009 |
| | | | 428/339 |
| 2017/0320292 | A1* | 11/2017 | Isoda ........................ B32B 7/12 |

FOREIGN PATENT DOCUMENTS

| | | |
|---|---|---|
| DE | 295720 A5 | 11/1991 |
| DE | 102006057049 A1 | 6/2008 |
| DE | 202008008318 U1 | 10/2009 |
| EP | 2248676 A1 | 11/2010 |
| FR | 3052390 A1 | 12/2017 |
| JP | 2004307303 A | 11/2004 |

\* cited by examiner

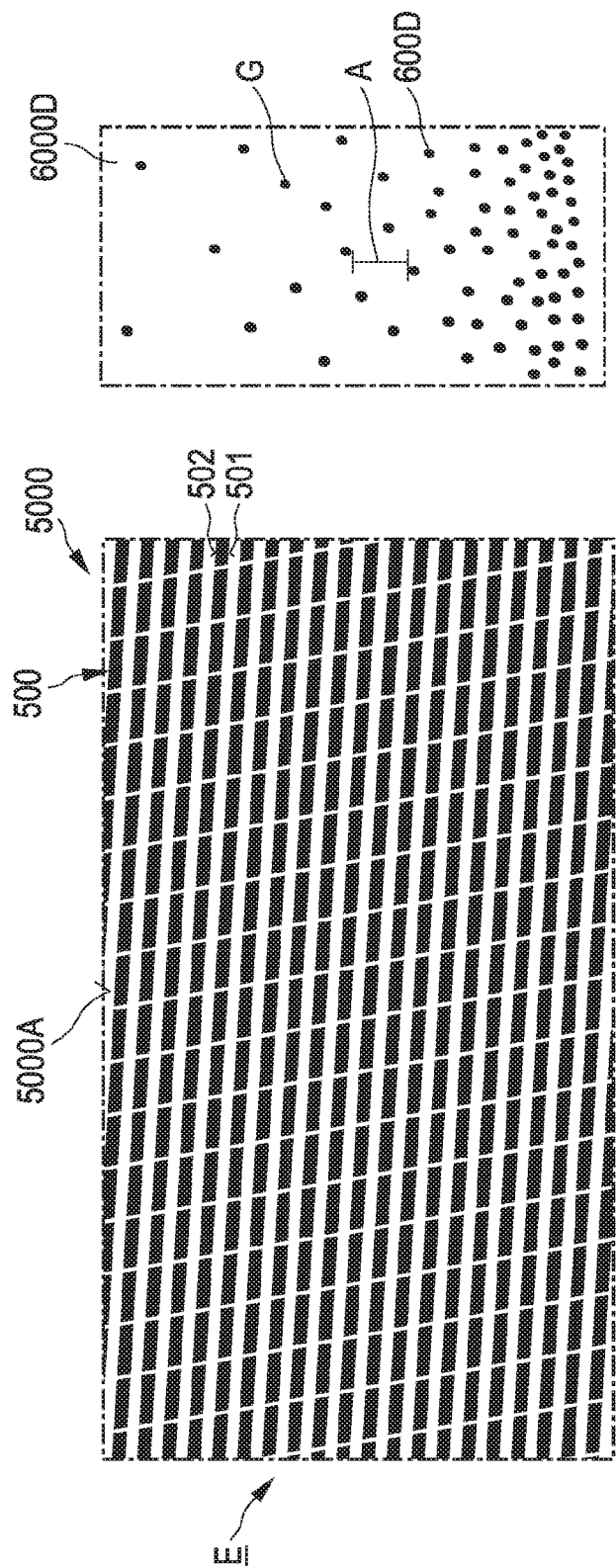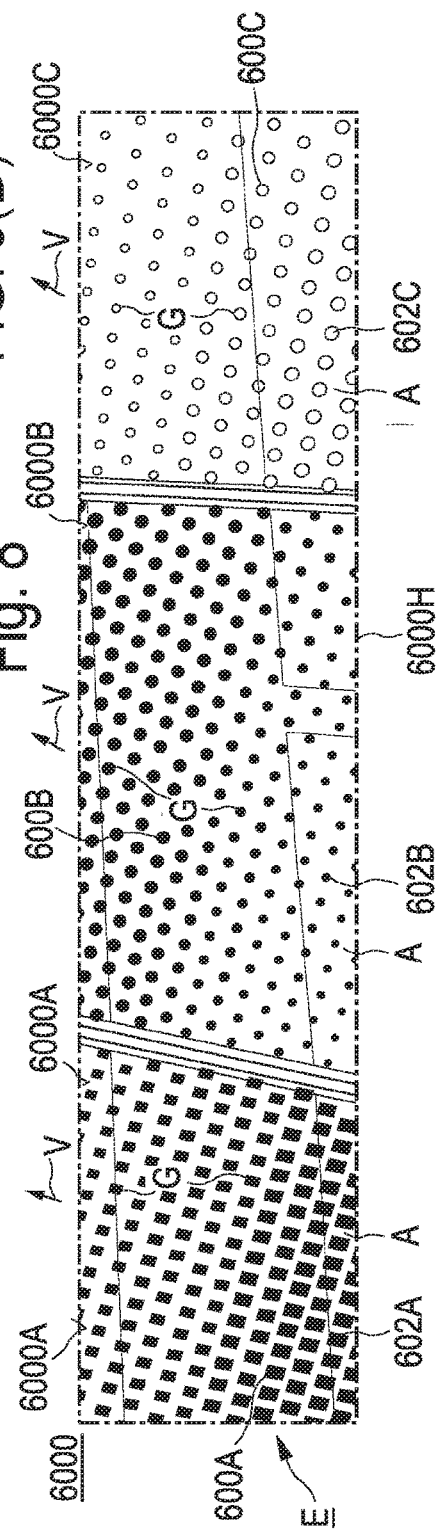

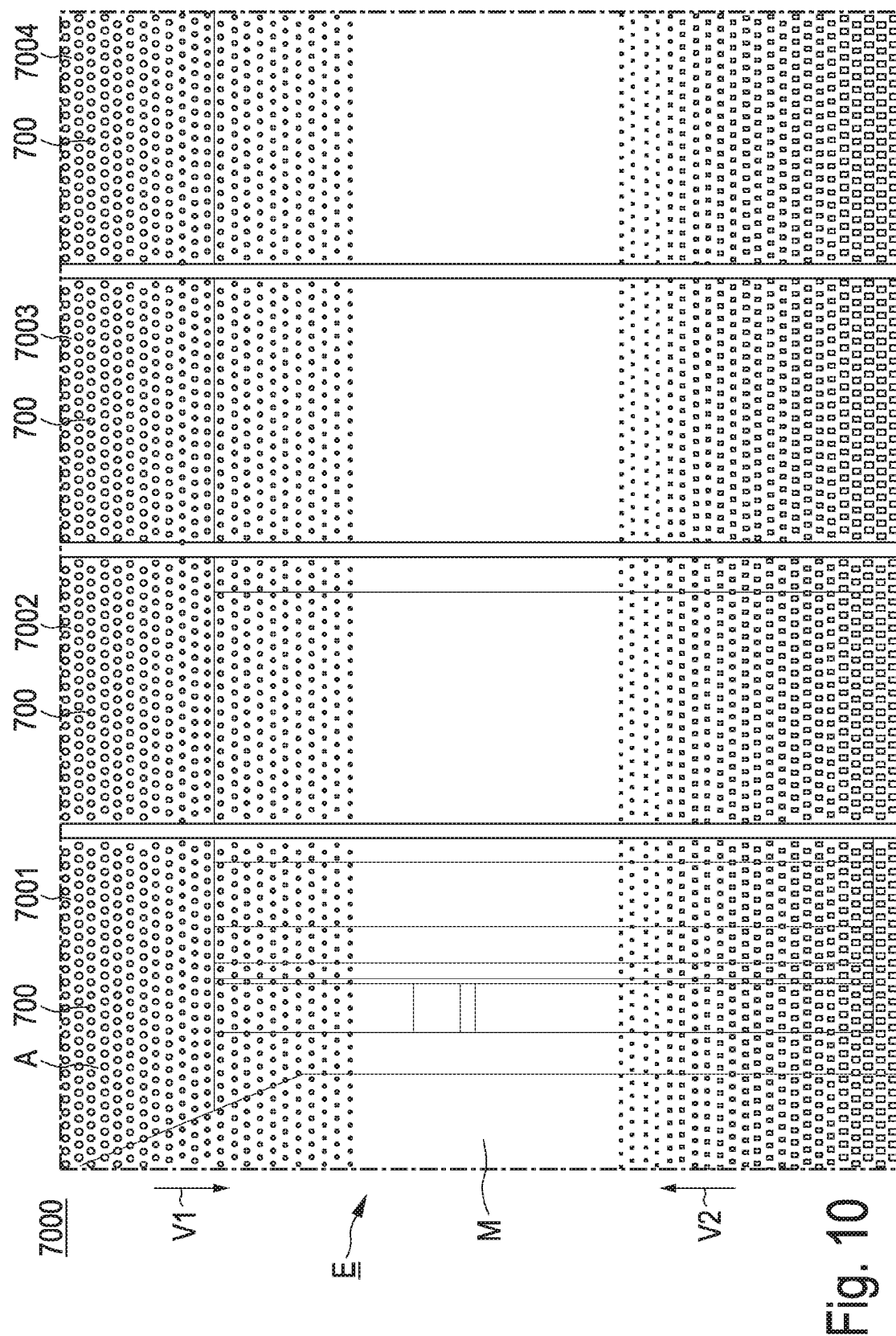

LAMINATED GLASS, LAMINATED SAFETY GLASS, AND METHOD FOR THE PRODUCTION THEREOF

CROSS REFERENCE TO RELATED APPLICATION

This is a continuation in part of 371 US national stage application of PCT/EP2018/072567 dated Aug. 21, 2018, the disclosure of which is incorporated by reference herein in its entirety as if set forth at length.

BACKGROUND OF THE INVENTION

The invention relates to a laminated glass, a laminated safety glass, a lamination foil arrangement, and also a process for the production of a lamination foil arrangement, of a laminated glass or of a laminated safety glass.

The prior art has already disclosed one-way glazing and presentation materials. The one-way transparency effect arises because this glazing or these display panels has/have a monolaterally light-absorbing coated layer structure with a large number of apertures. When the interlayer is viewed from this light-absorbing side, it appears transparent; the other side is reflective, and from this side the material is therefore non-transparent. Layer structures of this type are described in US 2009/0169795 A1, and are configured as point-grid foil or as woven fabric, in particular as metallic woven fabrics which are then coated on one side with light-absorbing material. Light-absorbing woven fabrics with reflective coating are moreover also known.

Laminated glazing is a composite made of at least two flat glass panes bonded by a tough tear-resistant, elastic lamination foil. This glazing is in particular used in the construction sector. Laminated glazing with appropriate adhesion is classified as laminated safety glazing. In the priority application, the German Patent and Trademark Office searched the following prior art relating to laminated glazing: DE 23 13 278 A and DE 20 2008 008 318 U1. The German Patent and Trademark Office has also searched DE 230 759 A and DD 2 95 720 A5 as prior art in the priority application in relation to reflective platelets known per se in the field of apparel.

However, the starting point for any type of glass facade is the single pane of glass, either in the form of float glass or in tempered form as single-pane safety glass (ESG) or as toughened glass (TVG). However, the latter is used only in the form of laminated glass or of laminated safety glass. When a single-pane safety glass (ESG) breaks, the size of the resultant fragments is small, about 10 mm, and their edges are blunt. When a toughened glass (TVG) breaks, it forms relatively large sections, and the cracks extend to the edge of the glass. Some residual loadbearing capability is retained.

A laminated safety glass has more safety features than a simple flat glass pane (penetration-resistant, significantly low risk of injury from splintering, residual load bearing capability after partial destruction); these result from the lamination foil which is used in the laminated safety glass and which is generally bonded durably to the glass panes with the aid of heat and pressure, and also sometimes in vacuo. Adhesion within the composite is decisive for classification of a laminated glass as laminated safety glass.

In particular, for facades, but also for interior glass walls, there is an increasing requirement for glazing that is transparent only when viewed from the interior, while also meeting safety requirements. At the same time, there is a need, specifically expressed by architects and their clients, for the greatest possible freedom in designing the visual aspects of facades.

SUMMARY OF THE INVENTION

Although layer structures known from the prior art, for example from US 2009/0169795 A1, such as point-grid foils or woven fabrics coated on one side for light-absorption, can be used as interlayer in laminated safety glazing, they restrict adhesion of the composite and are amenable to continuous production only in restricted widths; this greatly restricts use in particular in large-surface-area glass facade elements. Coated woven fabrics can moreover only be produced with identical mesh apertures across the entire area of a glass pane. This is the starting point of the invention, which has the object of providing a laminated glass or laminated safety glass which on the one hand meets the most stringent safety requirements and on the other hand optimizes freedom in the design of facades or interiors.

The object is achieved via a one-way laminated glass disclosed herein.

The invention also leads to a lamination foil arrangement disclosed herein for the production of a lamination foil composite for the one-way laminated glass of the invention.

The invention also leads to a process disclosed herein for the production of the lamination foil arrangement for the lamination foil composite of the one-way laminated glass of the invention.

In a first aspect of the invention, this is achieved via a laminated glass comprising a first and a second glass pane, and also comprising, arranged between the first and second glass pane and bonded to these, a lamination foil composite with a first and a second lamination foil, characterized in that a large number of paillettes with a first light-absorbing surface is arranged between the first and second lamination foil, where the light-absorbing surface of the paillettes faces toward the first lamination foil, and the paillettes are arranged at distances from one another such that when the laminated glass is viewed from the side corresponding to the light-absorbing surface of the paillettes it appears transparent.

It is preferable that in the one-way laminated glass the first and the second glass pane, and also a lamination foil composite which comprises a first and a second lamination foil and which is arranged between the first and second glass pane and is bonded to these, are in essence optically transparent. The gaps between the large number of paillettes arranged at distances from one another are therefore preferably in essence optically transparent; the laminated glass is therefore substantially optically transparent, or in principle transparent, only within the gaps.

However, light-absorbing structures such as black or dark structures are ignored by the human eye, in particular if they exhibit strong contrast to their surroundings; the structures appear to an observer to be color-neutral in relation to the surroundings, and are not perceived.

The situation is different in the case of reflective, pale-colored structures; these are perceived by an observer. A consequence of this is that by way of example a window pane with a large number of black stripes is transparent to an observer, who is therefore able to perceive clearly the environment on the other side of the pane; however, in the case of a large number of pale-colored, i.e. reflective, stripes in the same arrangement, the observer perceives the stripes clearly, and cannot, or is less able to, perceive the environment on the other side of the pane. The pale-colored structures here provide less contrast than the black structures in relation to the surroundings, and therefore the background behind the pale-colored structures is less strongly perceived and is blurred by the pale-colored structures.

The invention on the one hand includes the discovery that use of a large of paillettes between two lamination foils in a laminated glass can achieve good adhesion between the two lamination foils, because the coverage is lower than in the case of point-grid foils and better bonding between the lamination foils can therefore be achieved, and that moreover the use of individual paillettes which, unlike the previously known point-grid foils or woven fabrics, do not have any interbonded structure, allows significantly greater degrees of freedom of arrangement and shaping, and that therefore the only remaining restriction on design freedom is the retention of one-way transparency. It has moreover also been found that also in cases where advantageous standard lamination procedures are used the use of paillettes mitigates problems of air inclusions and resultant clouding in laminated glass and reduces problems with adhesion in the composite which are promoted by the intersection points of warp and weft filaments in woven fabrics. Use of paillettes moreover also permits easy manufacture of structures that change across the area of a pane, for example inter-paillette distances that increase with the height of the facade.

For the purposes of the present invention, the term "paillettes" means thin single- or multilayer platelets. The term "light-absorbing" means at least 60% absorption of visible light. Structures or materials described as light-absorbing appear to the human eye to be black, or certainly very dark. Lamination foils for laminated glazing are tear-resistant, tough and elastic; examples of materials used here are polyvinyl butyral (PVB), ethylene-vinyl acetate (EVA), polyurethane (PU) and ionoplastics or ionomers, i.e. polymer materials with ionic bonds between the macromolecules alongside the usual covalent bonds.

Advantageous embodiments of the invention are described below. The additional features of the embodiments can be combined with one another to form further embodiments unless they are described in the description expressly as alternatives to one another.

It is preferable that the laminated glass is a laminated safety glass, i.e. has adhesion between the individual constituents that permits classification as laminated safety glass. The first and second glass pane are advantageously configured as toughened glass; for the purposes of the invention it is possible to use either flat glazing or curved glazing. The additional possibility of using curved glazing as part of the composite further increases design freedom for facades.

A second surface of the paillettes which faces toward the second lamination foil is advantageously optically reflective, in particular specularly reflective. Reflection of light at the second surface of the paillettes contributes to avoidance of, or substantial reduction of, transparency with the laminated glass is viewed from that side. At the same time, the nature of the reflection, for example a high degree of specular reflection, or comparative mattness, contributes to the design of the facade, and can be used to provide individuality.

The paillettes preferably have a layer structure comprising a decorative film and a light-absorbing layer. The decorative film here can comprise a specularly reflective polymer film, preferably a specularly reflective polyester film. The light-absorbing layer is preferably a light-absorbing plastics foil, in particular a plastics foil lacquered so as to absorb light or printed so as to absorb light, or is a light-absorbing coating of the decorative film.

It is preferable that the plastics foil is a polyester foil, in particular a polyethylene terephthalate foil. During the lamination procedure in the production of laminated glazing, polyester foils exhibit particularly good stability, very little distortion, and very good adhesion to the lamination foil; the shapes of the large number of paillettes are therefore particularly successfully retained through the lamination procedure. It is also preferable that the decorative film additionally comprises a transparent polymer film and/or a colored coating, the colored coating being arranged on a side of the decorative film that is opposite to the light-absorbing layer. The colored coating can in particular be a coating applied by way of printing techniques, for example sublimation printing or digital printing; alternatively, it can also have been applied in the form of a lacquer.

The paillettes advantageously have an adhesive layer on the light-absorbing layer on a side facing away from the decorative film. This firstly permits easy securing of the paillettes on the first lamination foil in the production procedure, and application on a side that after subsequent installation faces toward an interior space moreover protects the adhesive from decomposition due to insolation. The adhesive has preferably been applied as adhesive film with thickness 40 to 60 µm.

The layer thickness of decorative film and light-absorbing layer together is advantageously between 50 µm and 280 µm, in particular between 60 µm and 180 µm. The layer thickness of the decorative film here is preferably in the range 20 to 100 µm.

The layer thickness of the decorative film and/or of a light-absorbing layer and/or of an optically reflective layer, in particular of a specularly reflective layer, can also preferably be significantly less than the above values, in particular in the range 1 to 20 µm.

It is also preferably possible to use a laminate of decorative film and/or of a light-absorbing layer and/or of an optically reflective layer to realize, in particular changing or shimmering, multicolor effects on the paillettes.

It is also preferably possible to use a laminate of decorative film and/or of a light-absorbing layer and/or of an optically reflective layer to realize 3D effects or other spatial effects on the paillettes. By way of example, it is possible to realize optically distorting convex or concave visual effects on the paillettes, for example optically distorting curved-mirror visual effects, in particular convex or concave visual effects.

It is also possible to combine the multicolor and 3D effects on the paillettes by using a laminate of decorative film and/or of a light-absorbing layer and/or of a light-reflective layer. In one embodiment, all paillettes of the large number of paillettes have identical shape and size and are in a regular arrangement. This embodiment achieves a uniform visual effect.

Alternatively, however, it is also possible that the paillettes of the large number of paillettes have different size dimensions and/or are in an irregular arrangement. This permits appropriate modifications in the visual image, for example denser arrangements or larger coverage areas, in more sensitive regions of the facades, or greater separations or smaller paillettes in other regions in order to increase the quantity of incident light.

It is also possible to vary shape, size and arrangement in order to produce particular coherent forms of the overall visual effect of the large number of paillettes on the exterior facade. In particular, use of paillettes can also provide a progressive pattern across the height or width of the laminated glass, i.e. by way of example a denser arrangement of paillettes in a lower region of a glass pane and other arrangements in an upper region. It is preferable that the paillettes are strip-shaped, rectangular, round or oval.

In a preferred variant of this embodiment, progressions of shape, size and arrangement can be varied, with preferably continuously increasing or decreasing trends. By way of example, a progression of the preferably transparent gaps between the paillettes and/or their shape, size and/or arrangement can be varied in a preferential direction, with increasing trend or decreasing trend, i.e. by way of example can increase or decrease.

The size dimensions of the paillettes are preferably in the range 2 to 20 mm. By way of example, the average diameter of paillettes whose length is approximately equal to their width, in particular with approximately round or polygonal shape, can be in the range 2 to 50 mm, preferably in the range 2 to 20 mm.

By way of example, the average width of elongate paillettes, in particular elongate paillettes that are strip-shaped or straight-linear or curved, can be in the range 2 to 50 mm, preferably in the range 2 to 20 mm. However, the size dimensions of the paillettes are not restricted thereto, and can also be significantly greater.

The average gaps, in particular the average optically transparent gaps, between the large number of paillettes arranged at distances from one another can be in the same range 2 to 50 mm, preferably 2 to 20 mm, but are not restricted thereto and can also be significantly greater.

In an advantageous embodiment, the laminated glass additionally comprises, arranged between the first and second lamination foil, a first rigid plastics foil, where the large number of paillettes has been adhesive-bonded on a surface of the first rigid plastics foil. With this embodiment it is possible to minimize any possible distortion in the arrangement of the large number of paillettes between the lamination foils, in that the large number of paillettes have been adhesive-bonded on the rigid plastics foil. The rigid plastics foil retains its shape during the lamination procedure, and the arrangement of the large number of paillettes is therefore also substantially retained without distortion. In other embodiments, any possible distortion of the arrangement can also be included in calculations for the initial arrangement of the large number of paillettes on the first lamination foil, and can thus be compensated in order to achieve a desired arrangement in the finished laminated glass.

In one embodiment, the laminated glass further comprises a second rigid plastics foil bonded to the first rigid plastics foil in a manner such that the large number of paillettes is arranged between the first and the second rigid plastics foil.

It is preferable that the first and/or second rigid plastics foil is a polyester foil, in particular polyethylene terephthalate foil (PET foil). It has also proven to be advantageous that the first and/or second rigid plastics foil is a polycarbonate foil or a foil made of a transparent thermoplastic; this can by way of example be a foil made of polymethyl methacrylate (abbreviated to PMMA, or acrylic sheet).

In another embodiment, the laminated glass comprises a third glass pane, where the third glass pane and the first or second glass pane have been bonded by way of a further lamination foil composite with a first and a second lamination foil and with a large number of paillettes with a first light-absorbing surface. With this embodiment, it is firstly possible to achieve further improvement of the safety aspects of the laminated glass in comparison with an embodiment with only two glass panes and a lamination foil composite; secondly, use of a further lamination foil composite with paillettes permits three-dimensional facade design via the arrangement of paillettes in different planes.

The arrangement of laminated glazing in the first aspect of the invention, after installation, is preferably such that the first lamination foil faces toward an interior space and the second lamination foil faces toward an exterior space. It is thus ensured that an observer can look outward through the laminated glass, but not inward.

In a second aspect, the invention provides a lamination foil arrangement for the production of a lamination foil composite for a laminated safety glass or laminated glass in the first aspect comprising a lamination foil and a large number of paillettes with a first light-absorbing surface which have been secured on the first lamination foil, as semifinished product for the production of a laminated glass or laminated safety glass of the invention. The lamination foil arrangement, and also the process described below for the production of a lamination foil arrangement and of a laminated glass, share the advantages of the laminated glass in the first aspect of the invention.

In a third aspect, the invention provides a process for the production of a lamination foil arrangement for a lamination foil composite of a laminated safety glass or laminated glass, comprising the steps of:
provision of a decorative film,
application of a light-absorbing layer on one side of the decorative film to produce a layer structure,
punching or cutting of a large number of paillettes made of the layer structure,
transferring the large number of paillettes onto a first lamination foil.

The application of a light-absorbing layer to one side of the decorative film is preferably achieved by arranging and securing a light-absorbing plastics foil thereon. In an alternative embodiment, the decorative film is coated to absorb light, in particular is lacquered.

In one embodiment, the process additionally comprises:
production of a decorative film, comprising the steps of:
provision of a specularly reflective polymer film,
colored coating of the specularly reflective polymer film and/or bonding of the specularly reflective polymer film to a polymer film that is in particular transparent.

In one embodiment, during the transfer of the large number of paillettes these are transferred directly onto the first lamination foil or alternatively are first transferred onto a first rigid plastics foil and then, together with the first rigid plastics foil, are transferred onto the first lamination foil. It is preferable here that the paillettes are applied and adhesive-bonded onto the first rigid plastics foil or the first lamination foil. In one embodiment, the process additionally comprises application of an adhesive layer on the light-absorbing layer.

In a fourth aspect, the invention provides a process for the production of a laminated glass, comprising the steps of:
provision of a lamination foil arrangement produced by a process in the third aspect of the invention,
arrangement of a second lamination foil to form a lamination foil composite in a manner such that the location of the large number of the paillettes is between the first and second lamination foil,
provision of two glass panes,
introduction of the lamination foil composite between the glass panes and lamination of the laminated glass.

The same process can also be used to produce a laminated safety glass.

The lamination of the laminated glass is achieved here in autoclaves or in a lamination oven with exposure to heat, pressure and/or vacuum.

It is to be understood—alone or in combination with the above-mentioned developments—that the arrangement of the paillettes with a first and second surface between the first lamination foil and the second lamination foil as claimed can be considered as a raster-like or grating-like pattern and has been found to be particularly useful as such but also for use in specific purposes. In particular, an open pattern of localized structured paillettes or extended structured paillettes can be arranged. Localized structures of paillettes can be formed, for instance as dots, in particular as circular dots or rectangular dots or other kinds of polyeder-kind of dots. Extended paillettes can for instance be formed as stripes or stripe-like extended forms.

A size dimension of the paillettes of the large number of paillettes are preferably in a range of between 2 to 50 mm, in particular in a range of between 3 to 20 mm, in particular of between 4 to 10 mm. In combination or alone an average gap, in particular a distance, between paillettes of the large number of paillettes is in the range of between 20 to 120 mm, in particular between 40 to 100 mm, in particular between 50 to 90 mm.

As such in general and in particular based on the above mentioned measures a ratio of paillettes size dimension in relation to an average gap between the paillettes, in particular a paillettes nearest neighbor distance, is in a range of between 0.02 to 0.25, in particular in the range of between 0.025 to 0.2, in particular in the range of between 0.08 to 0.12. This is, for example, in particular the above-mentioned size dimensions of paillettes can even be in the range of 1 to 50 mm, more preferably in the lower range of 1 to 10 mm of size. In combination or alone, in particular, the average gaps between the paillettes can preferably be even realized in the range of beyond 50 mm, in particular beyond 60, 70 or 80 mm, in particular up to 120 mm. Thus, in a particularly preferred development, the average gaps of paillettes, arranged regular or irregular, is between 20 to 120 mm, wherein a size dimension of the paillettes of the large number of paillettes is in a range of between 2 to 50 mm. For instance, in a particularly preferred development, the size dimensions of the paillettes are in the range of between 5 to 10 mm, whereas the average gaps or distances between the paillettes is in the range of between 40 to 100 mm, in particular between 50 to 90 mm.

It has been proven that a coverage ratio of the laminated glass by the large number of paillettes is particular advantageous when below 5%, in particular below 2.5%, in particular below 1%. The human eye is less irritated by the paillettes second surface, which faces toward the second lamination foil and is optically reflective, the lower the coverage ratio is. Further in combination or alone it has been found that the coverage ratio of the laminated glass by the large number of paillettes can set constant or varying; this is constant with regard to the whole glass pane or varying over a glass pane (like e.g. shown in an example of embodiment of FIG. 10). The coverage ratio naturally can be set depending on a size dimension of the large number of paillettes and depending on an average gap, in particular a distance, between paillettes of the large number of paillettes. This is, the larger the average gap, in particular a distance, and the smaller the size dimension of the paillettes is, the lower the coverage ratio will be. A lower coverage ratio as such seems to be less irritating for the human eye.

In a particularly preferred embodiment, the size dimensions and average gaps or distances between the localized or extended paillettes are selected such that a coverage ratio of the glass surface is below 5%, in particular even below 3% or even below 2%, and in a particularly preferred development even below 1%. This is more particularly, the size of the paillettes can be selected particularly small as preferably in the range between 1 to 20 mm, whereas the average gaps or distance between the paillettes is in the range between 50 to 100 mm or even up to 120 mm or even 200 mm or more.

As an example, a size of paillettes of around 9 mm with a distance of paillettes of around 90 mm has been found to be particularly useful. As another example, a size of paillettes of around 3 mm with a distance of paillettes of around 15 mm has been found to be particularly useful. This has been found very advantageous in particular for localized paillettes like dots or the like localized structures. For extended paillettes, like stripes, a width of stripes of 2 mm with a distance of more than 25 mm, even more than 30 mm or even more than 50 mm have been found to be particularly useful. These and other examples present useful embodiments with an advantageous low coverage rate.

These kinds of arrangements of size dimensions and average gaps, or distances of paillettes are particularly useful in combination with the use of film layers or the like paillettes to realize 3D effects or other spatial effects on the paillettes. Also, these kinds of developments have been found to be particularly useful in combination with the use of a laminate or a decorative film and/or a light-absorbing layer and/or an optically reflective layer to realize changing of shimmering or multicolor effects.

Notwithstanding the above-mentioned developments alone or in combination the use of high- or semi-optically reflective second surfaces which face toward the second lamination foil have been found particularly useful to create 3D effects or other spatial effects on the paillettes when the laminated glass is viewed from the side corresponding to the optically reflective surface of the paillettes.

Notwithstanding the above-mentioned developments alone or in combination to realize 3D effects or other spatial effects on the paillettes the use of layer thickness of the paillettes as described above, e.g. in the range of between 50 µm to 280 µm, in particular between 60 µm and 180 µm has been found to be useful to support 3D effects or other spatial effects because a somewhat elevated impression is created by a layer thickness as such; in particular any kind of bending, warping and/or folding can be useful to be combined with the claimed reflectivity to create said 3D effects or other spatial effects on the paillettes second surface, i.e. optically reflective surface, when the laminated glass is viewed from the side corresponding to the optically reflective surface of the paillettes and thus it appears less transparent and with showing said 3D effects or other spatial effects. The layer thickness of the decorative film and/or of a light-absorbing layer and/or of an optically reflective layer, in particular of a optically reflective layer, can also preferably be significantly less than the above values, in particular in the range 1 to 20 µm.

Still the dark light-absorbing surface of the paillettes facing towards the first lamination foil allows to be viewed from the side corresponding to the light-absorbing surface of the paillettes and thus the laminated glass appears transparent.

For instance, a highly or semi-optically reflective second surface can be realized by a metallic surface like, for instance, an aluminum surface. A highly reflective surface can, for instance, be achieved by a metallic reflective coating, which is optically reflective above 85%, in particular, above 90%. This, in particular, is with regard to aluminum coating. A semi-reflective metallic surface can be optically reflective below 85%, in particular, below 80%, in particular, below 75% like for instance, a 75% semi-reflective aluminum coating.

These kinds of metallic coatings can even be reflective up to 95%, 99% or even practically 100% reflective on the second surface. The first surface can be dark or even be black.

As outlined above, the optically reflective second surface can be used in a preferred development to create a decorative-like changing shimmering or multicolor effect or even 3D effect or other spatial effect. In combination with the dark or black first surface, it has been found that this can be achieved particularly preferably with an aluminum coating on a black paillette.

These and other arrangements of paillettes have been found to be applicable to the one-way laminated glass as outlined above without the need to harden the glass in manufacturing.

This is, a quite expensive manufacturing step is avoided, respectively not necessary, in float glass production. Without the need to harden the glass, detrimental effects like roller stripes or the like in production are absent. Further, the float glass production of the one-way laminated glass as described herewith is possible in a large scale-line format of, for instance, 2000×4000 or even 3200×6000 mm or even larger or at least longer. Thus, the one-way laminated glass can be produced in large sizes as described above and can be provided to construction areas or further production with only the need to be cut and sized according to the demands.

This has particular advantages when using security or compound glass products in installation in facades or for interior design, in particular, for laminated safety glass. In actual demands approximately 70% of the float glass for use for installation in facades should preferably not be hardened.

However, a problem arises with those glasses used for installation in facades when certain structures of effects are to be applied to the outside. One of these demands is appliances of visual structures on glasses used for installation in facades, in particular to reduce a bird-window strike. Most of the structures to be applied for such purposes like, for instance, the applying of foils or woven fabrics or the like suffer from the need, that the glass needs to be hardened to apply the structures for reducing a bird-window strike.

The inventive aspects and developments described above have no need to be hardened. In particular, for reducing a bird-window strike, it has been found particularly useful to apply one or more of the developments described above, in particular those with a dark first surface for light-absorbing effects and a decorative reflective second surface as described above and/or metallic second surface or the like for the paillettes for optical reflection on said second surface. It has been found that due to this optical layout of the paillettes, already a coverage ratio of below 5%, in particular below 3%, in particular below 2%, or even preferably below 1% is sufficient to efficiently reduce a bird-window strike.

More generally, it has been found that the one-way laminated glass as claimed is in a particularly preferred development comprising a large number of paillettes, wherein the coverage ratio of the number of paillettes as compared to the unit area of one-way laminated glass is below 5% or even below 4%, or even below 3%, or even below 2% and, in a particularly preferred development, even below 1%. This is, the gaps between the paillettes, which are optically transparent amounts to more than at least 95%. It has been found that even the kind of low coverage ratio of below 5%, as outlined above, is sufficient to efficiently reduce a bird-window strike for the claimed one-way laminated glass according to the concept of the invention in installation in facades.

BRIEF DESCRIPTION OF THE DRAWINGS

Further advantages, features and details of the invention will be apparent from the description below of the preferred embodiments, and also with reference to the drawings, where:

FIG. 8 shows an example of an embodiment of a laminated glass where a uniform visual effect is achieved;

FIG. 9A, FIG. 9B, FIG. 9C, FIG. 9D show an example of a laminated glass on a facade, where the paillettes of the large number of paillettes have different size dimensions and/or are in irregular arrangement, and an appropriately modified visual effect is concomitantly achieved;

FIG. 10 shows an example of a facade with a laminated glass similar to that in FIG. 9A and FIG. 9C.

DETAILED DESCRIPTION

Figure 1:
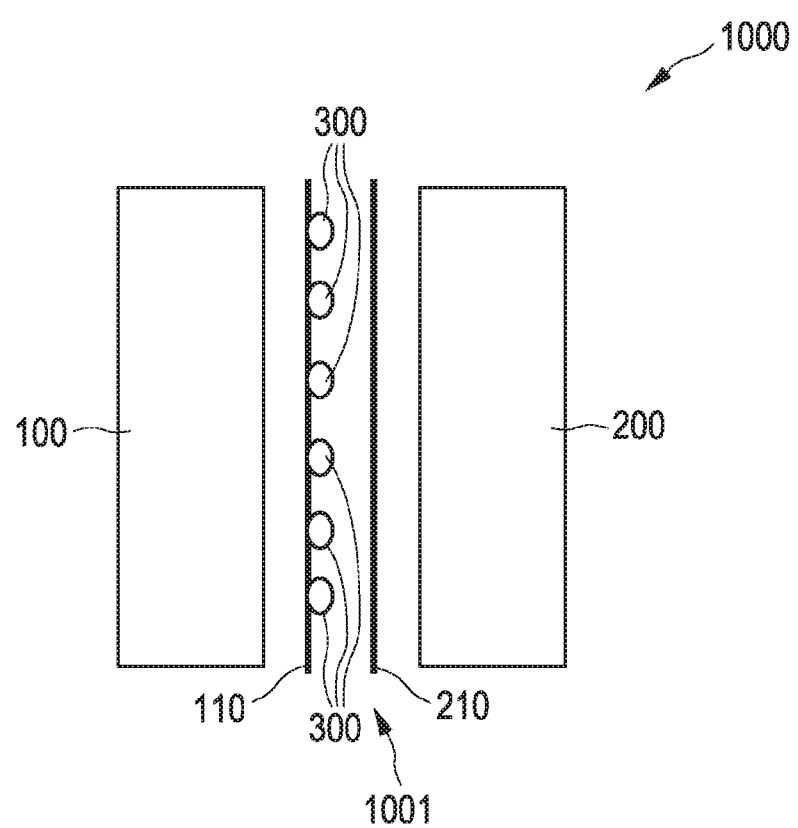
FIG. 1 is a diagram of the structure of an embodiment of a laminated glass in the first aspect of the invention.

FIG. 1 is a diagram of the structure of an embodiment of a laminated glass 1000 in the first aspect of the invention. The laminated glass 1000 is shown here in a partial exploded view. The laminated glass 1000 comprises a first glass pane 100, and also a second glass pane 200. Arranged between the first glass pane 100 and the second glass pane 200 is a lamination foil composite 1001 with a first lamination foil 110 and a second lamination foil 210. The lamination foil composite has been bonded to the first and second glass pane 100, 200. Arranged between the first lamination foil 110 and the second lamination foil 210 is a large number of paillettes 300. Each of the paillettes here has a light-absorbing surface, and this light-absorbing surface faces toward the first lamination foil 110. The paillettes 300 in the embodiment shown have a layer structure comprising a decorative film and a light-absorbing layer, and also an adhesive layer which secures the paillettes on the first lamination foil 110 and which has been applied on a side of the light-absorbing layer, this being the side facing away from the decorative film. The light-absorbing layer here is a black coating of the decorative film. The paillettes 300 here are arranged at distances from one another such that when the laminated glass 1000 is viewed from the side corresponding to the light-absorbing surface of the paillettes it appears transparent. Therefore, when the viewing direction of an observer is from the first glass pane 100 to the second glass pane 200 the laminated glass 1000 appears transparent, because the observer automatically ignores the light-absorbing paillettes. In the embodiment shown, the paillettes have the decorative film on the side facing toward the second lamination foil 210, said film being configured here to be specularly reflective. When the laminated glass is viewed from the side of the second glass pane 200 in the direction of the first glass pane 100 it therefore appears non-transparent to an observer. In this case, the reflective structures of the paillettes are clearly perceived, and viewing through the laminated glass 1000 therefore becomes more difficult. In one embodiment, the laminated glass 1000 can also be configured as laminated safety glass.

Figure 2:
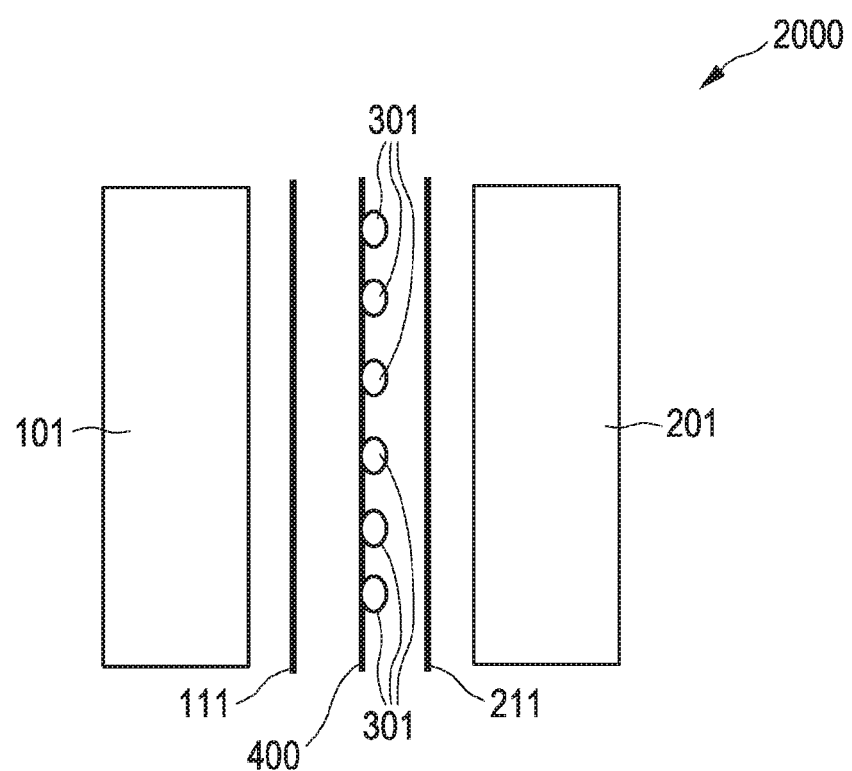
FIG. 2 is a diagram of the structure of another embodiment of a laminated glass in the first aspect of the invention.

FIG. 2 is a diagram of the structure of another embodiment of a laminated glass in the first aspect of the invention. The structure of the embodiment shown here of the laminated glass 2000 is similar to that of the laminated glass 1000 depicted in FIG. 1. The details below therefore relate mainly to the differences. As described above in respect of FIG. 1, the laminated glass 2000 has a first glass pane 101 and a second glass pane 201; arranged between these is a lamination foil composite comprising a first lamination foil 111 and a second lamination foil 211. Unlike the embodiment of FIG. 1, the paillettes 301 here are not arranged directly on the first lamination foil 111 and adhesive-bonded thereto, but instead are arranged on a first rigid plastics foil 400. This first rigid plastics foil 400 is configured to be rigid, i.e. during the lamination procedure it retains its shape, and the arrangement achieved for the large number of paillettes at the ingoing end of the production procedure is also retained through the lamination step, substantially without distortion. In the embodiment shown, the first rigid plastics foil is a polyester foil, in this case a polyethylene terephthalate foil. As described above in respect of FIG. 1, the paillettes 301 are a layer structure made of decorative film and of light-absorbing layer, the light-absorbing layer here being a black-lacquered polyester foil. In the embodiment shown, the thickness of the decorative film is 23 µm, while the thickness of the black-lacquered plastics foil is 125 µm. The paillettes 301 have been adhesive-bonded by way of an adhesive film to the rigid plastics foil 400. The thickness of the adhesive film in the embodiment shown is 50 µm.

Figure 3:
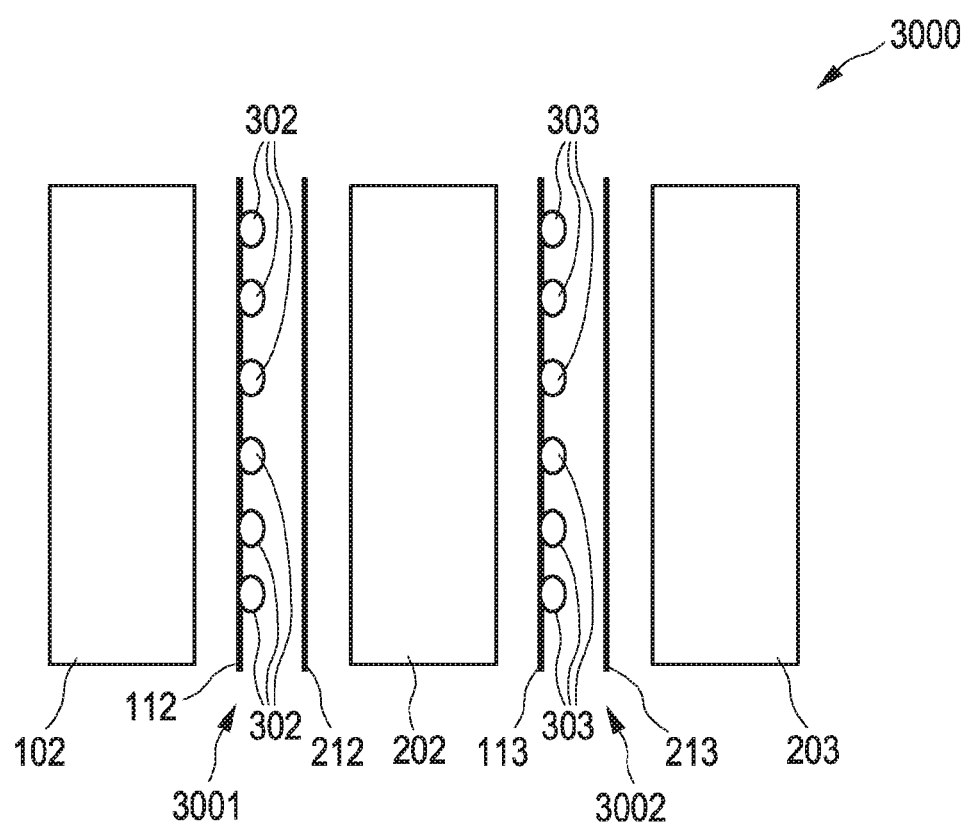
FIG. 3 is a diagram of the structure of another embodiment of a laminated glass in the first aspect of the invention.

FIG. 3 is a diagram of the structure of another embodiment of a laminated glass 3000. In addition to the structure shown in FIG. 1, the laminated glass 3000 comprises a third glass pane 203, and also a further lamination foil composite 3002, by way of which the third glass pane 203 has been bonded to the second glass pane 202. On that side of the second glass pane 202 that faces away from the third glass pane 203 there is, as in FIG. 1, a first glass pane 102 arranged, likewise bonded by way of a lamination foil composite 3001 comprising a first lamination foil 112 and a second lamination foil 212, arranged between which is a large number of paillettes 302. The further lamination foil composite 3002 likewise comprises a first lamination foil 113 and a second lamination foil 213, arranged between which is a large number of paillettes 303. These are arranged at distances from one another such that when the laminated glass is viewed from the side of the first glass pane 102 in the direction of the third glass pane 203 it continues to appear transparent. The light-absorbing surface of the paillettes 302 of the lamination foil composite 3001 and of the paillettes 303 of the further lamination foil composite 3002 here respectively faces toward the first lamination foil 112, 113, and both therefore face toward the first glass pane 102. Use of three glass panes firstly increases the strength of the entire laminated glass and enables production of a certified safety glass even in cases of somewhat reduced adhesion between lamination foil composite and glass panes. Secondly, by way of the arrangement of the paillettes 302, 303 in two planes it is possible to achieve spatial effects which provide further design-freedom advantages for a glass facade.

Figure 4:
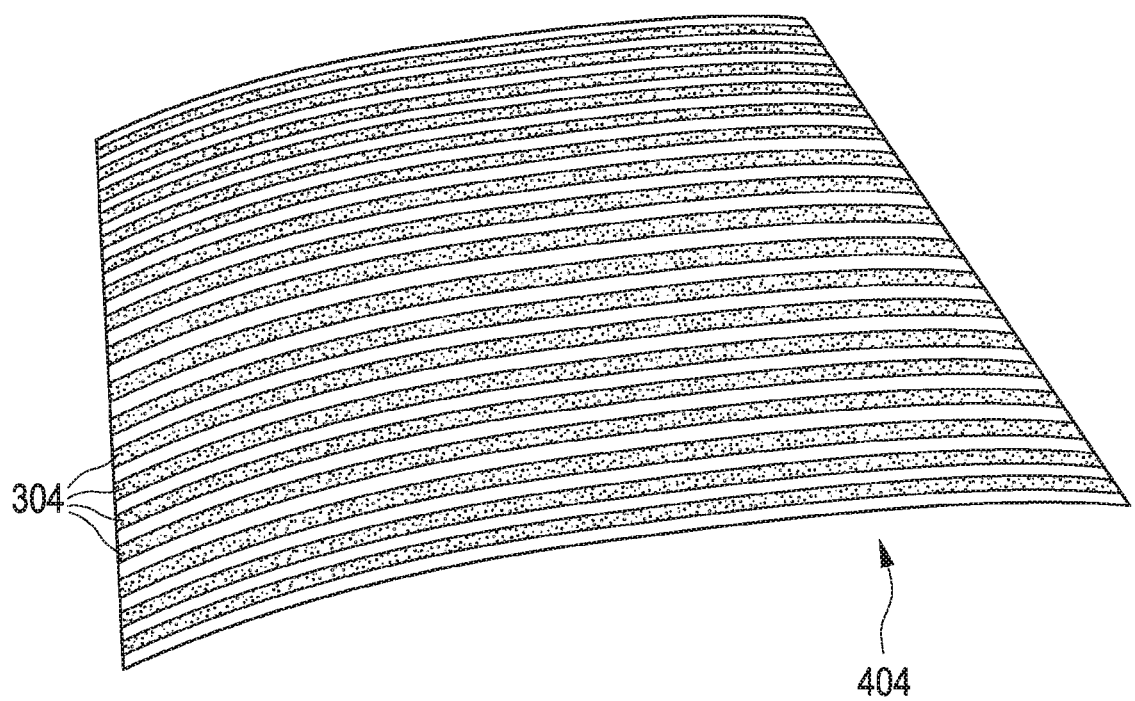
FIG. 4 shows by way of example a large number of paillettes on a rigid plastics foil.

FIG. 4 depicts by way of example a large number of paillettes 304 on a first rigid plastics foil 404. The paillettes shown here have been applied in regular strip form, and have not only the same width but also a consistent distance from one another. This depiction shows the specularly reflective surface of the paillettes; this surface would face toward the second lamination foil in a laminated glass of the invention.

Figure 5:
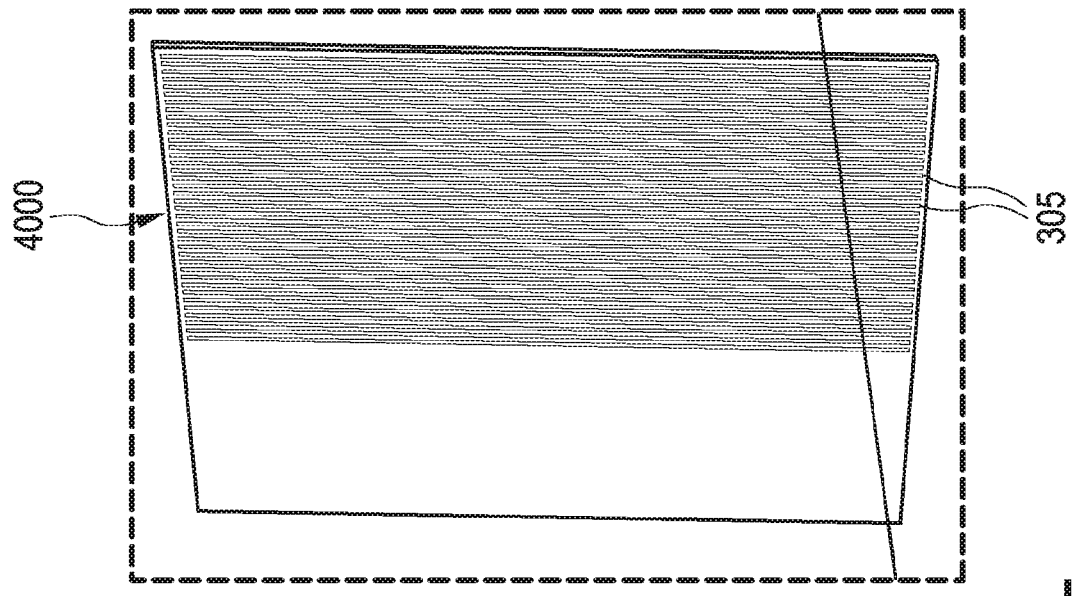
FIG. 5 shows by way of example an embodiment of a laminated glass.
Figure 5:
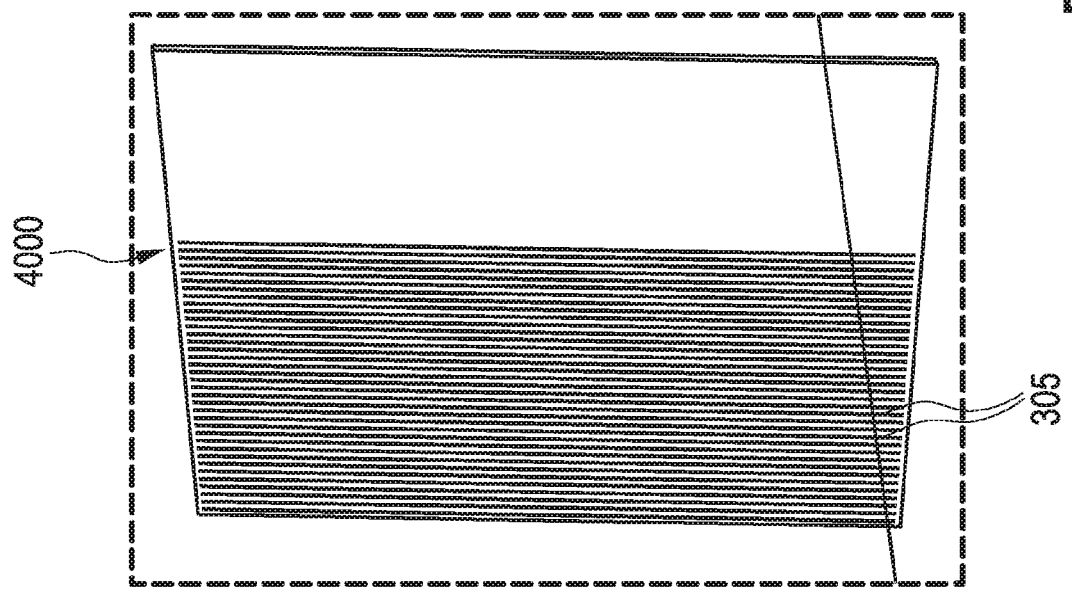

FIG. 5 shows an internal and external view of a laminated glass in the first aspect of the invention. The depiction on the left is an external view of the laminated glass 4000 where the reflective surface of the paillettes 305 is visible, i.e. the second glass pane faces toward the observer. In this view, that portion of the laminated glass 4000 that comprises the paillettes 305 appears less transparent; the observer's view is deflected by the reflective paillettes 305. In contrast, an internal view of the laminated glass 4000 can be seen on the right-hand side, the second glass pane therefore facing toward the observer. The light-absorbing surface of the paillettes 305 faces toward the observer here. This surface is ignored by the observer because of the strong contrast with the surroundings, and the laminated glass 4000 here therefore appears more transparent to the observer.

Figure 6:
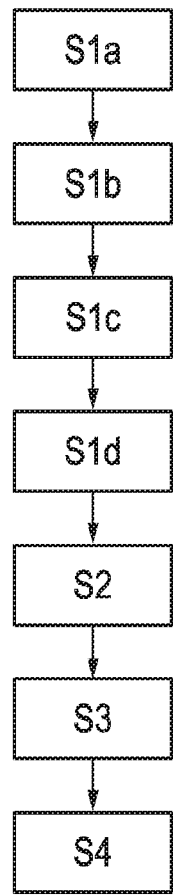
FIG. 6 is a flow diagram of a process for the production of a laminated glass in the fourth aspect of the invention.

FIG. 6 is a flow diagram of a process for the production of a laminated glass in a fourth aspect of the invention. The process comprises firstly the provision of a lamination foil arrangement for a lamination foil composite of the laminated glass. The lamination foil arrangement here is produced in the steps S1*a* to S1*d*. In step S1*a*, a decorative film is provided, onto one side of which a light-absorbing layer is applied in step 1*b* for the production of a layer structure. The light-absorbing layer here can be applied as coating or by way of arrangement and securing of a light-absorbing plastics foil on the decorative film. In step S1*c*, a large number of paillettes is punched or cut from the layer structure. In step S1*d*, the large number of paillettes is transferred onto a lamination foil. Before or after the punching or cutting of the large number of paillettes, an adhesive film is optionally applied onto the paillettes, or in the case of application before punching and cutting is applied to the layer structure, on the side corresponding to the light-absorbing layer.

After the provision of the lamination foil arrangement by way of the steps S1*a* to S1*d*, arrangement of a second lamination foil takes place in step S2 in order to form a lamination foil composite in a manner such that the location of the large number of the paillettes is between the first and second lamination foil. In step S3, two glass panes are then provided, between which the lamination foil composite is introduced in step S4. Lamination of the laminated glass then likewise takes place in step S4. The lamination takes place here with exposure to heat, pressure and/or vacuum.

Figure 7:
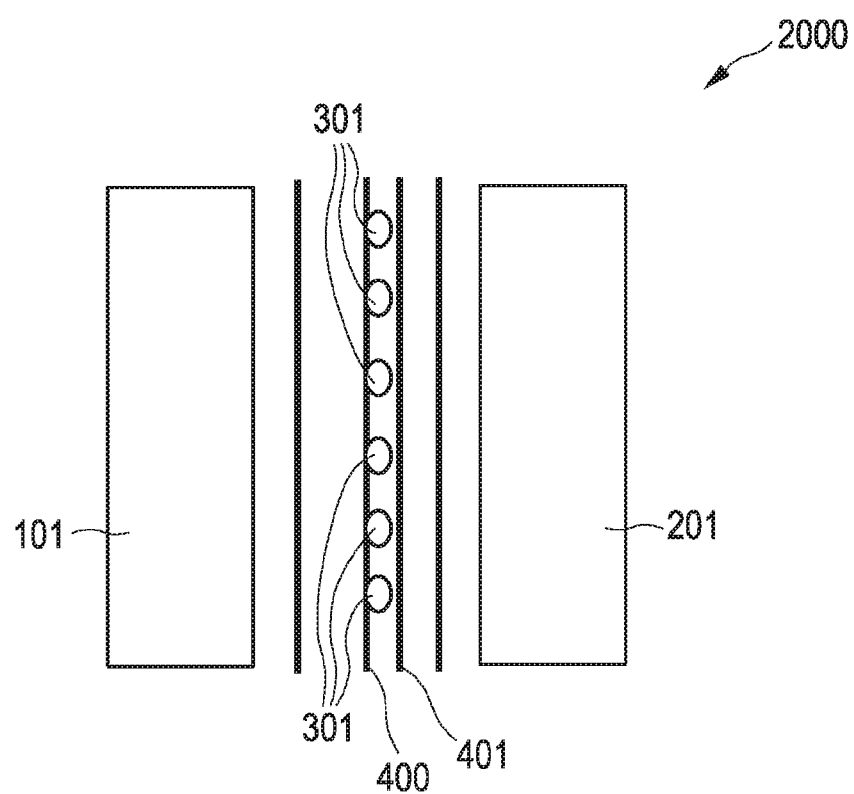
FIG. 7 is a diagram of the structure of another embodiment of a laminated glass in the first aspect of the invention.

FIG. 7 is a diagram of the structure of another embodiment of a laminated glass 2000 in the first aspect of the invention. The structure in essence corresponds to that depicted in FIG. 2. The laminated glass depicted here additionally comprises a second rigid plastics foil 401, bonded to the first rigid plastics foil 400 in a manner such that the large number of paillettes is arranged between the first and the second rigid plastics foil. The laminated glass 2000 here moreover also comprises a first glass pane 101 and a second glass pane 201, arranged between which is a lamination foil composite comprising a first lamination foil 111 and a second lamination foil 211. The paillettes 301 have been adhesive-bonded on the first rigid plastics foil 400. In the embodiment shown, the first rigid plastics foil 401 and the second rigid plastics foil are respectively a polyester foil, in this case a polyethylene terephthalate foil. The paillettes 301 have a layer structure made of decorative film and of light-absorbing layer, where the light-absorbing layer here is a black-lacquered polyester foil.

FIG. 8 shows an example of a laminated glass 5000 where all paillettes of the large number of paillettes 500 have an identical shape and size and are in regular arrangement, and a uniform visual effect E is concomitantly achieved. The paillettes 500 are arranged between a first and second lamination foil, which cannot be seen here, in a manner based on that explained in principle by reference to any of the preceding figures. In this example, the visible second surface 502 of the paillettes 500, which faces toward the second lamination foil, is configured to be specularly reflective; the other (not visible) first surface 501 of the paillettes 500, faces toward the first lamination foil, is configured here to be black.

The external side 5000A of a facade (not shown in its entirety here) with this laminated glass 5000 is therefore comparatively opaque, i.e. the laminated glass is less transparent when viewed from an exterior space and more transparent when viewed from an interior space, i.e. as explained in principle has one-way transparency when viewed from an interior space. The further technical effect thus achieved consists in visual resolution of the structures of an interior or exterior facade of a building by use of the one-way laminated glass thus configured.

FIG. 9 shows an example of a laminated glass 6000A, 6000B, 6000C on a facade 6000, where the paillettes 600A, 600B, 600C of the large number of paillettes respectively have different size dimensions, and an appropriately modified visual effect E is concomitantly achieved. The paillettes in a laminated glass can additionally or alternatively be in irregular arrangement; the latter is the case with the paillettes 600D in the laminated glass 6000D.

By way of example, a progression V of the preferably transparent gaps A between the paillettes 600D and/or the shape, size and/or arrangement G of the paillettes 600A, 600B, 600C can be varied in a preferential direction, with increasing trend or decreasing trend, i.e. by way of example can increase or decrease.

In FIG. 9A to FIG. 9C, the transparent gaps A between the paillettes 600A, 600B, 600C—the paillettes 600A in FIG. 9A being rectangular, the paillettes 600B, 600C in FIG. 9B and FIG. 9C being round—are in each case comparatively constant, and the arrangement of the paillettes 600A, 600B, 600C is regular; however, in FIG. 9A and FIG. 9C the progression V of the size of the paillettes 600A, 600C is varied in a continuously decreasing manner in approximately upward direction, and in FIG. 9B the progression V of the size of the paillettes 600B is varied in a continuously increasing manner in approximately upward direction.

The technical effect thus achieved in relation to the one-way laminated glass also consists in a visual stretching or compression of dimensions on an interior or exterior facade of a building by the laminated glass thus configured with (when viewed from inside) one-way transparency. When elements of laminated glass 6000A, 6000B, 6000C are arranged alongside one another in the entire facade 6000 in varying form it can moreover be seen that the background 6000H on the other side of the entire facade 6000, viewed from the exterior side 6000V of the entire facade 6000 has become invisible, or is no longer clearly visible, by virtue of the reflective second surface 602A, 602B, 602C of the paillettes 600A, 600B, 600C, this being the surface directed toward the exterior side 6000V of the entire facade 6000.

FIG. 9D shows an example where the transparent gaps A between the paillettes 600D—the paillettes 600D in FIG. 9D being round—are not constant and the arrangement of the paillettes 600D is irregular. The transparent gaps A increase in approximately upward direction, while, however, the size dimensions G of the paillettes 600D remain constant.

The technical effect thus achieved in relation to the one-way laminated glass also consists in a visual concealment of regular structures on an interior or exterior facade of a building by the laminated glass 6000D thus configured with (when viewed from inside) one-way transparency, and moreover there is a resultant progression V, increasing in an approximately upward direction, from a laminated glass with one-way transparency (when viewed from inside) to a laminated glass 6000D with two-way transparency, i.e. to a laminated glass 6000D that is also transparent when viewed from outside.

The size dimensions of the paillettes 600A, 600B, 600C, 600D in these embodiments of FIG. 9 can preferably be in the range 2 to 20 mm. By way of example, the average diameter of paillettes 600A, 600B, 600C, 600D whose length is approximately equal to their width, in particular with approximately round or polygonal shape, can be in the range 2 to 50 mm, preferably in the range 2 to 20 mm.

In another embodiment in a manner similar to that of FIG. 4 or FIG. 5 by way of example, the average width of elongate paillettes 304, 305, in particular elongate paillettes that are strip-shaped or straight-linear or curved, can be in the range 2 to 50 mm, preferably in the range 2 to 20 mm. However, the size dimensions of the paillettes are not restricted thereto, and can also be significantly greater.

The average gaps A, in particular the average optically transparent gaps A, between the large number of paillettes 600A, 600B, 600C, 600D arranged at distances from one another can be in the same range 2 to 50 mm, preferably 2 to 20 mm, but are not restricted thereto and can also be significantly greater.

FIG. 10 shows an example of a facade 7000 with elements of a laminated glass 7001, 7002, 7003, 7004 etc. similar to the laminated glass 6000A, 6000B, 6000C in FIG. 9A and FIG. 9C; i.e. in the laminated glass 7002, 7003, 7004 etc. the paillettes 700 of the large number of paillettes have different size dimensions and shapes G in a progression V1, V2, and initially have regular gaps A, and an appropriately modified visual effect E is concomitantly achieved.

The progression of the reflectivity decreases and the progression of the size of the paillettes 700 is varied in continuously decreasing manner, in a progression V2 which is varied in approximately upward direction and in a progression V1 which is varied in approximately downward direction.

This example shows that, very generally and irrespective of the present example, it is possible to vary not only the shape, size and distance mentioned but also the visual appearance or the visual effect of the paillettes.

The technical effect thus achieved in relation to the one-way laminated glass also consists in an increasing visual progression V2, in approximately upward direction, from a one-way laminated glass to a two-way laminated glass (i.e. laminated glass that is also transparent when viewed from outside) in the middle M of the facade; as can be seen in the form of visual effect E in FIG. 10, the same effect is achieved in inverted form from an upper side of the facade 7000, i.e. a progression V1 from a one-way laminated glass to a two-way laminated glass (i.e. laminated glass that is also transparent when viewed from outside) in the middle M of the facade 7000.

In a further particular preferred embodiment—in particular similar to the embodiment shown in FIG. 10—, a metallic optically reflective second surface 502 of the paillettes which face toward the second lamination foil according to the concept of the invention has been found to be particular effective to reduce bird-window strikes. In particular this regards the one-way laminated glass 1000, 2000, 3000, 4000, 5000, 6000A, 6000B, 6000C 6000D for installation in facades 6000, 7000 as described above. In this examplary embodiment the pailletes in the laminated glass are such that the second surface of the paillettes that faces toward the second lamination foil is optically reflective, namely metallic, in particular aluminum coated and/or where the first surface of the paillettes that faces toward the first lamination foil is black. The aluminum coating can be reflective or semi-reflective and due to the inherent decorative or even three-dimensional effect a bird can recognize these structures more pronounced.

Thus, the one-way laminated glass 1000, 2000, 3000, 4000, 5000, 6000A, 6000B, 6000C, 6000D for installation in facades 6000, 7000 according to this embodiment has an improved effect in reducing a bird-window strike as compared to commonplace application of foils or textures of woven fabrics. In this embodiment all paillettes of the large number of paillettes have identical shape and size and are in a regular arrangement, and a uniform visual effect is concomitantly achieved. Still alternatively, the laminated glass may also use the paillettes of the large number of paillettes which have different size dimensions and/or are in an irregular arrangement, and an appropriately modified visual effect is concomitantly achieved.

Further it appears that the improved effects can be achieved with even considerably lower coverage ratio of the pailletes which is far below commonplace values of 15%. Namely a reduction of bird-strike at the inventive one-way laminated glass can be achieved at coverage ratio values of below 5%, even below 1% as shown below.

The laminated glass in this embodiment according to the concept of the invention provides a size dimension of the paillettes of the large number of paillettes are in a range of between 2 to 50 mm, in particular in a range of between 3 to 20 mm, in particular of between 4 to 10 mm. Additionally or alternatively an average gap, in particular a distance, between paillettes of the large number of paillettes is in the range of between 20 to 120 mm, in particular between 40 to 100 mm, in particular between 50 to 90 mm.

The laminated glass in this embodiment according to the concept of the invention provides a coverage ratio of the laminated glass by the large number of paillettes is below 5%, in particular below 2.5%, in particular below 1%. Additionally or alternatively, the coverage ratio of the laminated glass by the large number of paillettes is set constant or varying depending on a size dimension of the large number of paillettes and depending on an average gap, in particular a distance, between paillettes of the large number of paillettes.

The laminated glass in this embodiment according to the concept of the invention provides a ratio of paillettes size dimension in relation to an average gap between the paillettes in particular, a paillettes nearest neighbor distance, is in a range of between 0.02 to 0.25, in particular in the range of between 0.025 to 0.2, in particular in the range of between 0.08 to 0.12.

In a qualified independent test a preferred test example of a resin laminated glass—in this test a PVB (Polyvinylbutyral) laminated glass—has been provided as a one-way laminated glass with paillettes in the form of laminated dots. The test has been made in comparison against clear float glass.

The specimens according to the concept of the invention were made of PVB laminated glass. The pattern was a grid of metallic reflective or semireflective spots applied to the PVB layer. The glass composition has been provided in this test with a 4 mm low iron glass plus a 2×0.76 mm PVB interlayer plus a 4 mm low iron glass. The glass elements have been applied on inner PVB.

The large number of paillettes have identical shape and size and are in a regular arrangement at, so to say, intersection crossings of grid lines of a rectangular field grid and a uniform visual effect is concomitantly achieved with this pattern. The grid pattern has been similar to the one as shown in FIG. 10 but in this test with regular spacings. Still other regular arrangements are also possible like e.g. an arrangement of crossings similar to a chess board or others. The dots in this test have been of 9 mm diameter with a distance from center-to-center of 90 mm—thus a coverage ratio of below 0.8% has been achieved. The paillettes of 9 mm dots have been arranged with a distance of 90 mm from point center to point center; thereby a covered area of 0.8% is achieved. This is the optically transparent gaps between the paillettes provide an area of more than 99% on the glass.

The multi-layer elements of paillettes each provide the optically reflective surface 502 as a reflective or semireflective aluminum coating. A pattern of reflective second surfaces—thus, more or less "shiny" in a first embodiment—and a pattern of semireflective second surfaces—thus, more or less "matt" in a second embodiment—has been provided with the paillettes arranged in the one-way laminated glass of this preferred embodiment. The paillettes each form a localized structural element like a dot of circular form in this example also a rectangular edge is possible also.

The material of the paillettes in the inventive one-way laminated glass elements feature a multi-layer element with a reflective aluminium coating on the second surface meant to form the a front surface to face toward an exterior space on a facade; this is visible for birds to appear less transparent. A colored black light-absorbing first surface is provided on the rear side of the paillettes and is meant to form a rear side towards an interior space of the facade; this is visible from inside a building to appear transparent. Due to the reflective composition of the layers, they are having a slight 3D effect as outlined above. The visual reflection of the reflective aluminum coating is 89% for the reflective and 75% for the semi-reflective structures as measured in the laminated glass of the one way laminated glass.

Also stripes of 2 mm width with 28 mm distance can be used as pattern of paillettes with high reflective of semi-reflective aluminum coating as explained. Both the raster of aluminum high- or semi-reflective outer second surface and inner light-absorbing, namely black, first surface of dots with 9 mm width and 90 mm distance and the horizontal or vertical stripes mentioned above are well recognized by birds.

Open patterns of grids or rasters, in particular dots or stripes as patterns of grids or rasters, are advantageous with an upper distance border of range of 120 mm, preferably between 20 mm and 90 mm. This means the patterns also can be irregular like e.g. shown in the embodiment of FIG. 10.

Numerous flight tunnel tests with various birds and at varying time of day and at varying light intensity have been executed according to a standard method. The outcome of the tests with both of the embodiments of the one-way laminated glass with aluminum reflective and semi-reflective 9 mm dots—described here as "shiny" in the first embodiment and "matt" in the second embodiment respectively—is very positive. All tests reveal for the embodiment according to the invention an astonishingly positive effect in reducing a birds-strike as it has been proven to have the effect that the inventive one-way laminated glass elements are well visible by birds; this is, in an improved way as compared to common place measures. Further, as outlined above the production of the inventive one-way laminated glass elements has well placed advantages. The effect of reducing a bird-strike at the one way laminated glass to the second reflective surface is surprising for three main reasons:

1) Where specular reflections occur, highly effective glass markings conventionally require positioning at surface;
2) The distances between the dots are larger than required to comply with the so-called 2"/4"-rule; the latter saying that horizontal stripes shouldn't exceed a vertical spacing of two inches and vertical stripes shouldn't exceed four inches of horizontal spacing. In the present case small spots instead of stripes are arranged in distances in both directions of 90 mm;
3) The diameter of the spots is less than 10 mm.

However, both tests yielded the same positive result and must be considered as being replicated. Light intensity had no influence on the results, and neither presence nor absence of direct sunlight have shown a statistically significant impact. Illumination of the foreground by direct sunlight is decisive for highly contrasting images at a glass surface. The results are reinforced by high sample sizes for sunny conditions. In summary, the marking patterns with the one-way laminated glass according to the concept of the invention are considered to be a novel technique of application and ranks among the best collision avoiding solutions to bird-strike window/facade glass tested so far.

LIST OF REFERENCE SIGNS

1000; 2000; 3000; 4000; Laminated glass
5000, 6000A, 6000B, 6000C, 6000D Laminated glass
6000, 7000 Facade
1001; 3001; 3002; Lamination foil composite
100; 101; 102 First glass pane
200; 201; 202 Second glass pane
203 Third glass pane
110; 111; 112; 113 First lamination foil
210; 211; 212; 213 Second lamination foil
300; 301; 302; 303; 304; 305 Paillettes
400; 404 First rigid plastics foil
401 Second rigid plastics foil
500 Paillettes
501 First surface of paillettes 500
502 Second surface of paillettes 500
600A, 600B, 600C, 600D, 700 Paillettes
602A, 602B, 602C Second surface of paillettes 600A, 600B, 600C
G Shape, size and/or arrangement of paillettes
A Average transparent gaps
V, V1, V2 Progression
E Visual appearance
M Middle of facade
6000H, 6000V Background, exterior side of the facade 6000

What is claimed is:

1. A one-way laminated glass (1000, 2000, 3000, 4000, 5000, 6000A, 6000B, 6000C, 6000D) for installation in facades (6000, 7000) or for interior design, comprising a first and a second glass pane (100, 101, 102, 200, 201, 202), and also comprising, arranged between the first and second glass pane and bonded to these, a lamination foil composite (1001, 3001, 3002) with a first lamination foil (110, 111, 112, 113) and with a second lamination foil (210, 211, 212, 213), where a large number of paillettes (300, 301, 302, 303, 304, 305, 500, 600A, 600B, 600C, 600D, 700) with a first light-absorbing surface (501) is arranged between the first lamination foil and second lamination foil, and a visual effect (E) is concomitantly achieved, where the light-absorbing surface (501) of the paillettes faces toward the first lamination foil, and the paillettes are arranged at distances from one another such that when the laminated glass is viewed from the side corresponding to the light-absorbing surface (501) of the paillettes it appears transparent, where a second surface (502) of the paillettes, which faces toward the second lamination foil, is optically reflective, and when the laminated glass is viewed from the side corresponding to the optically reflective surface (502) of the paillettes it appears less transparent.

2. The laminated glass as claimed in claim 1 where, after installation, the first lamination foil (110, 111, 112, 113) is intended to face toward an interior space and the second lamination foil (210, 211, 212, 213) is intended to face toward an exterior space.

3. The laminated glass as claimed in claim 1, where the shape, size and arrangement of the large number of paillettes can be varied in order to produce particular visually coherent forms of an overall effect in the visual effect of the large number of paillettes in relation to exterior space.

4. The laminated glass as claimed in claim 1, where all paillettes of the large number of paillettes have identical shape and size and are in a regular arrangement, and a uniform visual effect is concomitantly achieved.

5. The laminated glass as claimed in claim 1, where the paillettes of the large number of paillettes have different size dimensions and/or are in an irregular arrangement, and an appropriately modified visual effect is concomitantly achieved.

6. The laminated glass as claimed in claim 1, where
a size dimension of the paillettes of the large number of paillettes are in a range of between 2 to 50 mm, in particular in a range of between 3 to 20 mm, and/or
wherein an average gap, in particular a distance, between paillettes of the large number of paillettes is in the range of between 20 to 120 mm.

7. The laminated glass as claimed in claim 1, where
a coverage ratio of the laminated glass by the large number of paillettes is below 5% and/or
wherein the coverage ratio of the laminated glass by the large number of paillettes is set constant or varying depending on a size dimension of the large number of paillettes and depending on an average gap between paillettes of the large number of paillettes.

8. The laminated glass as claimed in claim 1, where a ratio of paillettes size dimension in relation to an average gap between the paillettes, is in a range of between 0.02 to 0.25.

9. The laminated glass as claimed in claim 1, where that second surface of the paillettes that faces toward the second lamination foil is specularly reflective, and/or where that first surface of the paillettes that faces toward the first lamination foil is black.

10. The laminated glass as claimed in claim 1, where the paillettes have a layer structure comprising a decorative film and a light-absorbing layer.

11. The laminated glass as claimed in claim 10, where the decorative film comprises a specularly reflective polymer film.

12. The laminated glass as claimed in claim 10, where the light-absorbing layer is a light-absorbing plastics foil or a light-absorbing coating of the decorative film.

13. The laminated glass as claimed in claim 12, where the light-absorbing plastics foil is a plastics foil that has been printed or lacquered so as to absorb light.

14. The laminated glass as claimed in claim 12, where the plastics foil is a polyester foil.

15. The laminated glass as claimed in claim 10, where the decorative film additionally comprises a transparent polymer film and/or a colored coating, where the colored coating is arranged on a side of the decorative film and said side is opposite to the light-absorbing layer.

16. The laminated glass as claimed in claim 1, additionally comprising, arranged between the first and second lamination foil, a first rigid plastics foil, where the large number of paillettes has been adhesive-bonded on a surface of the first rigid plastics foil.

17. The laminated glass as claimed in claim 16, further comprising a second rigid plastics foil bonded to the first rigid plastics foil in a manner such that the large number of paillettes is arranged between the first and the second rigid plastics foil.

18. The laminated glass as claimed in claim 1, comprising a third glass pane, where the third glass pane and the first or second glass pane have been bonded by way of a further lamination foil composite with a first and a second lamination foil and with a large number of paillettes with a first light-absorbing surface.

19. A lamination foil arrangement for the production of a lamination foil composite for a one-way laminated glass as claimed in claim 1, for installation in facades or for interior design, comprising a first lamination foil and a large number of paillettes with a first light-absorbing surface which have been secured on the first lamination foil, with concomitant production of a visual effect, where
  the light-absorbing surface of the paillettes faces toward the first lamination foil, and the paillettes are arranged at distances from one another such that when the laminated glass is viewed from the side corresponding to the light-absorbing surface of the paillettes it appears transparent, where
  a second surface of the paillettes, which faces toward a second lamination foil, is optically reflective, and when the laminated glass is viewed from the side corresponding to the optically reflective surface of the paillettes it appears less transparent,
  where, after installation, the first lamination foil is intended to face toward an interior space and the second lamination foil is intended to face toward an exterior space.

20. A process for the production of a lamination foil arrangement for a lamination foil composite of a one-way laminated glass as claimed in claim 1 for installation in facades or for interior design, comprising the steps of:
  provision of a decorative film,
  application of a light-absorbing layer on one side of the decorative film to produce a layer structure,
  punching or cutting of a large number of paillettes made of the layer structure,
  transferring the large number of paillettes onto a first lamination foil, and concomitantly producing a visual effect on the first lamination foil, where
  the light-absorbing surface of the paillettes faces toward the first lamination foil, and the paillettes are arranged at distances from one another such that when the laminated glass is viewed from the side corresponding to the light-absorbing surface of the paillettes it appears transparent, where
  a second surface of the paillettes, which faces toward a second lamination foil, is optically reflective, and when the laminated glass is viewed from the side corresponding to the optically reflective surface of the paillettes it appears less transparent,
  where, after installation, the first lamination foil is intended to face toward an interior space and the second lamination foil is intended to face toward an exterior space.

21. The process as claimed in claim 20, where the application of a light-absorbing layer on one side of the decorative film is achieved by arranging and securing a light-absorbing plastics foil thereon.

22. The process as claimed in claim 20, additionally comprising:
  production of a decorative film, comprising the steps of:
  provision of a specularly reflective polymer film,
  colored coating of the specularly reflective polymer film and/or bonding of the specularly reflective polymer film to a polymer film that is in particular transparent.

23. The process as claimed in claim 20, where during the transfer of the large number of paillettes
  these are transferred directly onto the first lamination foil, or
  these are initially transferred onto a first plastics foil, in particular rigid plastics foil, and then are transferred together with the first polyester foil onto the first lamination foil.

24. The process for the production of a one-way laminated glass as claimed in claim 1 for installation in facades or for interior design, in particular laminated safety glass, comprising the steps of:
  provision of a lamination foil arrangement produced by a process as claimed in claim 20,
  arrangement of a second lamination foil to form a lamination foil composite in a manner such that the location of the large number of the paillettes is between the first and second lamination foil,
  provision of two glass panes,
  introduction of the lamination foil composite between the glass panes and lamination of the laminated glass.

* * * * *